US008228327B2

(12) United States Patent
Hendrickson et al.

(10) Patent No.: US 8,228,327 B2
(45) Date of Patent: Jul. 24, 2012

(54) NON-LINEAR DEPTH RENDERING OF STEREOSCOPIC ANIMATED IMAGES (75) Inventors: Andrew D. Hendrickson, Burlingame, CA (US); Robert M. Neuman, Santa Clarita, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1165 days.

(21) Appl. No.: 12/040,573

(22) Filed: Feb. 29, 2008

(65) Prior Publication Data
US 2009/0219283 A1 Sep. 3, 2009

(51) Int. Cl.
G06T 17/00 (2006.01)
(52) U.S. Cl. .......... 345/420; 345/473; 382/154; 348/51; 348/E13.026; 348/E13.071
(58) Field of Classification Search .................. 345/419, 345/420, 422, 427, 473; 348/51, E13.026, 348/E13.071; 352/57, 87; 382/154
See application file for complete search history.

(56) References Cited

U.S. PATENT DOCUMENTS

| | | | |
|---|---|---|---|
| 5,877,779 A | 3/1999 | Goldberg | |
| 6,466,185 B2* | 10/2002 | Sullivan et al. | 345/6 |
| 6,583,787 B1 | 6/2003 | Pfister et al. | |
| 6,677,939 B2* | 1/2004 | Uchiyama | 345/419 |
| 7,088,361 B2 | 8/2006 | Boekhorst | |
| 7,133,041 B2 | 11/2006 | Kaufman et al. | |
| 7,227,526 B2* | 6/2007 | Hildreth et al. | 345/156 |
| 7,233,332 B2 | 6/2007 | Lokovic et al. | |
| 7,894,662 B2* | 2/2011 | Bushell et al. | 382/154 |
| 7,898,522 B2* | 3/2011 | Hildreth et al. | 345/156 |
| 2001/0016082 A1 | 8/2001 | Ichimura | |

OTHER PUBLICATIONS

Farell "Orientation-Specific Computation in Stereoscopic Vision". Published 2006.*
Bleyer et al. "A layered stereo matching algorithm using image segmentation and global visibility constraints". Published 2004.*
Popescu et al. "Three-dimensional Display Rendering Acceleration Using Occlusion Camera Reference Images". Published 2005.*
Debevec, Paul E., "Modeling and Rendering Architecture from Photographs: A hybrid geometry-and image-based approach," Computer Graphics Proceedings, Annual Conference Series, 1996, XP 000682717, University of California at Berkeley, Aug. 4, 1996.
Examination Report, EP Appl. No. 09716811.6, Applicant, Disney Enterprises, Inc. dated Mar. 16, 2011, European Patent Office.
Feldmann, I., "Nonlinear Depth Scaling for Immersive Video Applications," Proceedings of 4th International Workshop on Image Analysis for Multimedia Interactive Service (WIAMIS 2003). London, UK, pp. 433-438, Apr. 2003.
European Patent Office, Munich Germany, Examination Report, for Appl. No. 09 716 811.6-2218, dated Mar. 30, 2012.

* cited by examiner

Primary Examiner — Kimbinh T Nguyen
(74) Attorney, Agent, or Firm — Marsh Fischmann & Breyfogle, LLP; Kent A. Lembke (57) ABSTRACT A method for rendering stereoscopic images with non-linear depth variation. The method includes storing content in memory that is ready for rendering, e.g., computer animated images including animated objects or models. A processor is operated to position stereo or horizontally offset cameras and to render the images based on a non-linear relationship between disparity assigned to one or more of the animated objects and a distance between the cameras and the objects. The non-linear relationship is defined by a function or algorithm callable by the processor such as a function that defines a curved depth variation for the computer animated scene. In other cases, the non-linear relationship is defined by stored table, and the rendering includes using the distance between the cameras and an object to retrieve the disparity value to assign to that object. More than one non-linear relationship may be used to render objects with differing depth variations.

18 Claims, 7 Drawing Sheets

NON-LINEAR DEPTH RENDERING OF STEREOSCOPIC ANIMATED IMAGES

BACKGROUND OF THE INVENTION

1. Field of the Invention

The present invention relates, in general, to stereoscopic or three dimensional (3D) image generation and projection, and, more particularly, to systems and methods for producing stereoscopic images for 3D projection or display, with at least a portion of the images being generated to provide enhanced depth rendering and, in some cases, unique depth effects in the rendered in the computer generated (CG) or computer-animated images.

2. Relevant Background

Computer animation has become a standard component in the digital production process for animated works such as animated films, television animated shows, video games, and works that combine live action with animation. The rapid growth in this type of animation has been made possible by the significant advances in computer graphics software and hardware that is utilized by animators to create CG images. Producing computer animation generally involves modeling, rigging, animation, and rendering. First, the characters, elements, and environments used in the computer animations are modeled. Second, the modeled virtual actors and scene elements can be attached to the motion skeletons that are used to animate them by techniques called rigging. Third, computer animation techniques range from key framing animation where start and end positions are specified for all objects in a sequence to motion capture where all positions are fed to the objects directly from live actors whose motions are being digitized. Fourth, computer rendering is the process of representing visually the animated models with the aid of a simulated camera.

There is a growing trend toward using 3D projection techniques in theatres and in home entertainment systems including video games and computer-based displays, and, to render CG images for 3D projection (e.g., stereoscopic images), a pair of horizontally offset, simulated cameras is used to visually represent the animated models. More specifically, using 3D projection techniques the right eye and the left eye images can be delivered separately to display the same scene or images from separate perspectives so that a viewer sees a three dimensional composite, e.g., certain characters or objects appear nearer than the screen and other appear farther away than the screen. Stereoscopy, stereoscopic imaging, and 3D imaging are labels for any technique capable of recording 3D visual information or creating the illusion of depth in an image. The illusion of depth in a photograph, movie, or other two-dimensional image is created by presenting a slightly different image to each eye. In most animated 3D projection systems, depth perception in the brain is achieved by providing two different images to the viewer's eyes representing two perspectives of the same object with a minor deviation similar to the perspectives that both eyes naturally receive in binocular vision.

The images or image frames used to produce such a 3D output are often called stereoscopic images or a stereoscopic image stream because the 3D effect is due to stereoscopic perception by the viewer. A frame is a single image at a specific point in time, and motion or animation is achieved by showing many frames per second (fps) such as 24 to 30 fps. The frames may include images or content from a live action movie filmed with two cameras or a rendered animation that is imaged or filmed with two camera locations. Stereoscopic perception results from the presentation of two horizontally offset images or frames with one or more object slightly offset to the viewer's left and right eyes, e.g., a left eye image stream and a right eye image stream of the same object. The amount of offset between the elements of left and right eye images determines the depth at which the elements are perceived in the resulting stereo image. An object appears to protrude toward the observer and away from the neutral plane or screen when the position or coordinates of the left eye image are crossed with those of the right eye image (e.g., negative parallax). In contrast, an object appears to recede or be behind the screen when the position or coordinates of the left eye image and the right image are not crossed (e.g., a positive parallax results).

Many techniques have been devised and developed for projecting stereoscopic images to achieve a 3D effect. One technique is to provide left and right eye images for a single, offset two-dimensional image and displaying them alternately, e.g., using 3D switching or similar devices. A viewer is provided with liquid crystal shuttered spectacles to view the left and the right eye images. The shuttered spectacles are synchronized with the display signal to admit a corresponding image one eye at a time. More specifically, the shutter for the right eye is opened when the right eye image is displayed and the liquid crystal shutter for the left eye is opened when the left eye image is displayed. In this way, the observer's brain merges or fuses the left and right eye images to create the perception of depth.

Another technique for providing stereoscopic view is the use of anaglyph. An anaglyph is an image generally consisting of two distinctly colored, and preferably, complementary colored, images. The theory of anaglyph is the same as the technique described above in which the observer is provided separate left and right eye images, and the horizontal offset in the images provides the illusion of depth. The observer views the anaglyph consisting of two images of the same object in two different colors, such as red and blue-green, and shifted horizontally. The observer wearing anaglyph spectacles views the images through lenses of matching colors. In this manner, the observer sees, for example, only the blue-green tinted image with the blue-green lens, and only the red tinted image with the red lens, thus providing separate images to each eye. The advantages of this implementation are that the cost of anaglyph spectacles is lower than that of liquid crystal shuttered spectacles and there is no need for providing an external signal to synchronize the anaglyph spectacles. In other 3D projection systems, the viewer may be provided glasses with appropriate polarizing filters such that the alternating right-left eye images are seen with the appropriate eye based on the displayed stereoscopic images having appropriate polarization (two images are superimposed on a screen, such as a silver screen to preserve polarization, through orthogonal polarizing filters). Other devices have been produced in which the images are provided to the viewer concurrently with a right eye image stream provided to the right eye and a left eye image stream provided to the left eye. Still other devices produce an auto-stereoscopic display via stereoscopic conversion from an input color image and a disparity map, which typically is created based on offset right and left eye images. While these display or projection systems may differ, each typically requires a stereographic image as input in which a left eye image and a slightly offset right eye image of a single scene from offset cameras or differing perspectives are provided to create a presentation with the appearance of depth.

With the recent growing surge in development and sale of 3D projection systems and devices, there is an increased demand for high quality stereoscopic images that provide high quality and pleasant viewing experiences. One challenge facing stereographers is how to create an aesthetically appealing image while avoiding the phenomenon of "cardboarding," which refers to a stereoscopic scene or image that appears to include a series of flat image planes arrayed at varying depths (e.g., similar to a pop-up book). Rendering of left and right eye images is performed using linear depth processing using ray casting or ray tracing techniques that involves following a straight line connecting objects, light sources, and the simulated stereo cameras. CG images rendered with linear depth variation throughout the scene provides a real world view, but such rendering can produce cardboarding due to various combinations of lens focal lengths selected for the cameras and staging of the scene being imaged by the cameras. For example, there are generally trade offs between a viewer's comfort (e.g., limiting parallax to acceptable ranges) and cardboarding problems.

Another problem that arises in the staging and later rendering of a stereoscopic image is wasted space. The storytelling space for a stereographer includes the screen plane (i.e.; at zero pixel shift), screen space into or behind the screen, and theater space toward the viewer or audience from the screen plane. The theater space is used by creating crossed or negative parallax while the screen space is used by creating divergent or positive parallax in the stereoscopic images. The total display space may be measured in pixels and is often limited to less than about 70 pixels in total depth. Wasted space occurs when a long lens is used for the cameras or when a foreground figure is ahead of an object with a normal lens. In these cases, there often is a relatively large amount of depth (e.g., large percentage of the 70 available pixels) located between a foreground figure and objects or environment elements located behind the foreground figure or object. Simply adding overall stereoscopic depth (e.g., increasing the storytelling depth parameter) to a scene often is not productive because it results in undesirable results such as excessive positive and/or negative parallax (e.g., the added depth can cause the amount of parallax to exceed limits of parallax at which images viewed can be comfortably fused). Some efforts to eliminate or limit the wasted storytelling space have included multi-rigging or using multiple camera pairs for each or several select objects to give better depth or volume to the CG image. For example, one camera rig or pair may be focused on a foreground figure while another is focused on a background object, and the resulting CG image levels are composited or combined to form the final CG image. The result can be a better rounded foreground figure e.g., less cardboarding) and less wasted space.

Using multiple camera pairs is relatively complex in some environments and is not always a useful solution because it does not produce acceptable results if there is a physical connection between the two objects that are the focus of the camera pairs. If both objects are shown to be touching the ground, disconnects or unwanted visual artifacts are created during compositing and rendering of the CG image such as where the ground contacts one or both of the objects. A limitation of multi-rig techniques is that they depend upon being able to divide the scene into non-interconnected image levels since the depth tailoring offered by this technique creates a discrete set of linear depth functions and does not allow for seamless transitions blending between the depth functions.

SUMMARY OF THE INVENTION

The present invention addresses the above problems by providing non-linear rendering methods and systems for generating stereoscopic images with enhanced use of storytelling space or depth and, in some cases, unique effects achieved by defining a non-linear rendering function rather than relying only upon linear ray tracing or ray casting rendering techniques. Rendering using a ray tracing or ray casting method involves using straight lines to connect objects, light sources, and cameras. The inventors recognized that these linear ray methods are provided as a function or algorithmic portion of the rendering process carried out by a CG imaging system (e.g., a processor, 3D graphics hardware/firmware/software, and the like), but the inventors decided there is no reason that distance or spacing between modeled objects must be linear.

Hence, the non-linear rendering methods and systems described herein include at least some non-linear aspect that deviates from conventional ray tracing and ray casting techniques. For example, the lines used for ray tracing are curved according to a defined depth (or transfer) function. The curve may be defined relatively simply or be more complex, and the depth function may be linked to a particular one or set of the objects or be independent of the rendered objects. In other embodiments (or in combined embodiments), look up tables may be used to define pixel disparity so as to provide non-linear relationship between an object's distance from a camera and pixel disparity (as is the case for linear rendering). The use of non-linear rendering greatly increases artistic control for an animator or a stereographer because they can define parameters of the non-linear depth function (or a curve defined by such a function between a camera and an object) to vary parameters of the curve such as degree of bend, radius, complexity of curvature, and the like to achieve an effect, e.g., to draw attention to or away from particular scene objects. In some cases, the use of non-linear rendering will be used to eliminate "wasted space" between objects such as between a foreground object and a background object, and in other cases the effect will be subtle (e.g., a slight or small bending or curving of a ray tracing line or ray) to provide more rounding or volume to an object without distracting a viewer.

More particularly, a computer-based method is provided for rendering stereoscopic images. The method includes storing a set of images in memory that are ready for rendering, e.g., include computer animated objects or models such as in one or more image levels that may be composited. The method continues with operating a processor to position a pair of stereo cameras for imaging the set of images (e.g., horizontally offset, virtual cameras for imaging left and right eye images). The method includes rendering the set of images with the processor based on a non-linear relationship between disparity or a disparity value (e.g., a number of pixels) assigned to one or more of the animated objects or models and a distance between the cameras and the one or more objects or models. In one implementation, the non-linear relationship is defined by a transfer function callable by the processor such as a function that defines a curve or curved depth variation for the computer animated images or scene. In other cases, the non-linear relationship may be defined by a table stored in the memory, and the rendering step would then include using the distance between the cameras and an object to retrieve the disparity value to assign to that object. More than one non-linear relationship may be used in the rendering step, and these multiple non-linear relationships (e.g., multiple non-linear depth functions) may be linked to differing ones of the animated objects. The non-linear relationship may be defined such that an assigned disparity is less than what it would be if a linear relationship was utilized during rendering.

According to another aspect of the invention, code or logic readable by a computer may be provided on disk or other digital data storage device or medium. The code may cause a computer to retrieve a set of digitized content from memory.

The code may further cause the computer to render the digitized content from a pair of offset, virtual cameras to generate left eye and right images that have non-linear depth variation. The left and right eye images are stored in memory and may be used to generate stereoscopic images for display/projection on 3D capable devices. The non-linear depth variation may be created during the rendering by assigning disparity values to animated objects or models in the digitized content, with the disparity values being non-linearly related to distances from the cameras to the objects. The disparity values may be retrieved from a look up table relating horizontal offsets between the left and right eye images to the distances of the objects from the cameras or the disparity values may be derived using a transfer function defining a curved variation in depth in the left and right eye images. The code may also cause the computer to display on a monitor a plurality of non-linear depth functions and to receive a user's input of a selection for use in the rendering. In some cases, the user may assign more than one non-linear depth function and link the functions to the various objects in the content such that differing objects would be treated differently during the rendering relative to their disparity/camera distance relationship.

DETAILED DESCRIPTION OF THE PREFERRED EMBODIMENTS

Briefly, embodiments of the present invention are directed to methods and systems for generating left and right eye images (or frames) that are used as or in forming stereoscopic images (such as by projection via a polarizing filter or the like) in a 3D projection or display system. In contrast to conventional rendering using linear techniques such as ray tracing with straight lines connecting objects and cameras, the inventive methods and systems perform non-linear depth rendering for at least one modeled object in creating the rendered images.

Aside from creative choices or effects that can be provided by using non-linear rendering to alter the depth-distance relationship, there are practical concerns related to the physiology of a viewer of a stereoscopic image formed from a rendered left and right eye image pair. For example, there are limits to the amount of positive and negative parallax that a viewer can comfortably process (e.g., fuse two disparate objects). Further, use of non-linear rendering techniques also allow a stereographer to select non-linear depth definitions (such as a look up table to provide disparity values in pixels for particular object distances from the camera or a depth function) such that objects have volume or roundness to avoid cardboarding. Cardboarding can arise from various combinations of lens focal lengths and staging of a scene to be imaged or rendered, and adding overall stereoscopic depth to the scene can result in undesirable results such as excessive positive and/or negative parallax.

Figure 1A:
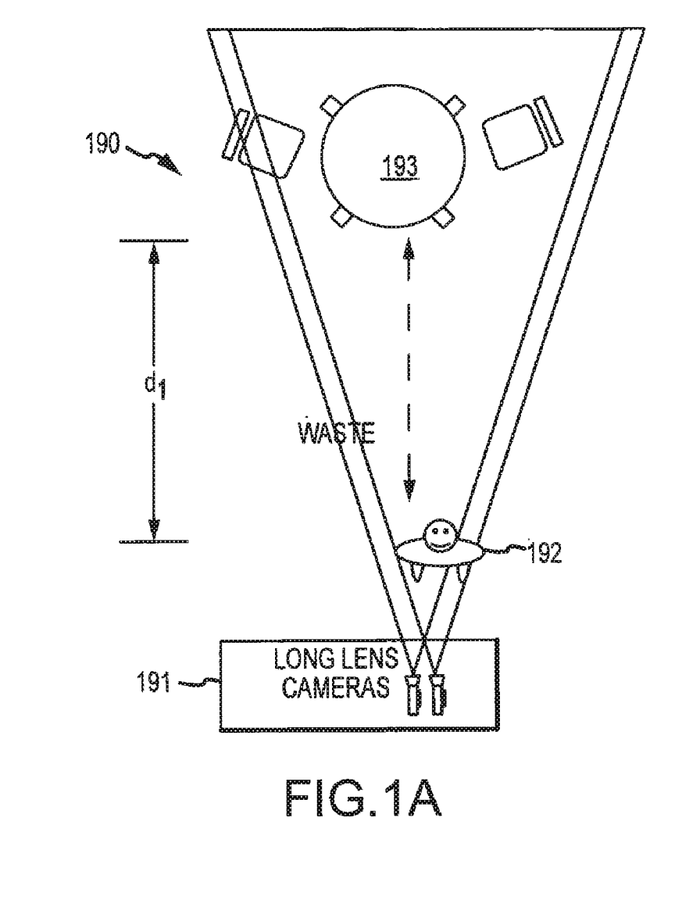
FIGS. 1A and 1B illustrate in simplified form animated objects in a storytelling or animation space showing potentially wasted space between a foreground object and a background object and use of non-linear rendering to remove, or at least lessen, such wasted space.
Figure 1B:
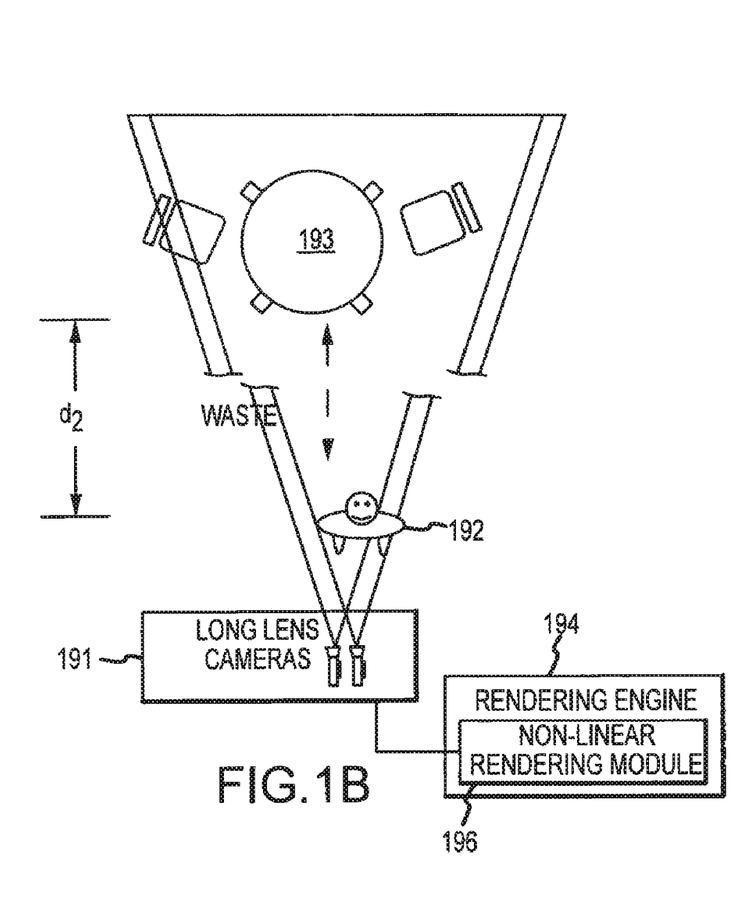

FIG. 1A illustrates one example of a scene or shot 190 that is being modeled for imaging and that may be prone to cardboarding or at least to wasted storytelling space. As shown, a pair of virtual cameras 191 are provided and set to have long lenses. A foreground object 192 has been modeled and positioned a distance, $d_1$, in front of background object 193. When linear rendering techniques are used, rendering of the scene 190 will result in a large portion of the distance, $d_1$, being "wasted" in the sense that it uses up the storytelling depth (such as 60 to 80 pixels or the like) available for rendered objects while no additional objects are present in the space. FIG. 1B, in contrast, illustrates the same scene as it may appear if rendered using non-linear depth techniques of an embodiment of the present invention. As shown, the same pair of long lens camera 191 is used to render the objects 192, 193, but the distance, $d_2$, between the foreground and background objects 192 and 193 is significantly smaller than the original or linear distance, $d_1$. This results in little or at least reduced wasted space in the rendered scene. Non-linear rendering such as shown in FIG. 1B may be performed by a rendering engine 194 (e.g., firmware and software run by a CPU or processor adapted to render left and right eye images using the paired, horizontally-offset cameras 191 and animated models 192, 193 or other composited image levels). The rendering engine 194 may be adapted to perform non-linear rendering as described herein or it may call a non-linear rendering module 196 to perform such rendering. In a typical embodiment, the module 196 may simply be a called routine that is used in place of linear algorithms to determine depth of an object and/or the disparity to assign to the object (or portions of the object).

The process of generating or creating left and right eye image pairs or image streams (or primary and alternate eye image pairs) using non-linear rendering will typically be implemented through the use of a computerized workstation with associated software, hardware, and memory for storing animated models/image levels (e.g., animated objects or image frames ready for rendering), non-linear rendering functions and/or disparity look tip tables, and resulting image streams. Further, the primary and alternate eye images may be used in combination to provide stereographic images that may be stored, transmitted, and/or displayed or projected using digital communication networks, compression techniques, and any of a number of conventional 3D-capable display/projection devices. Hence, before discussing specific implementations of processes implementing the non-linear depth rendering techniques, it may be useful to describe representative networks, computer systems, storage devices, software, and other tools useful for implementing embodiments of the invention.

Figure 2:
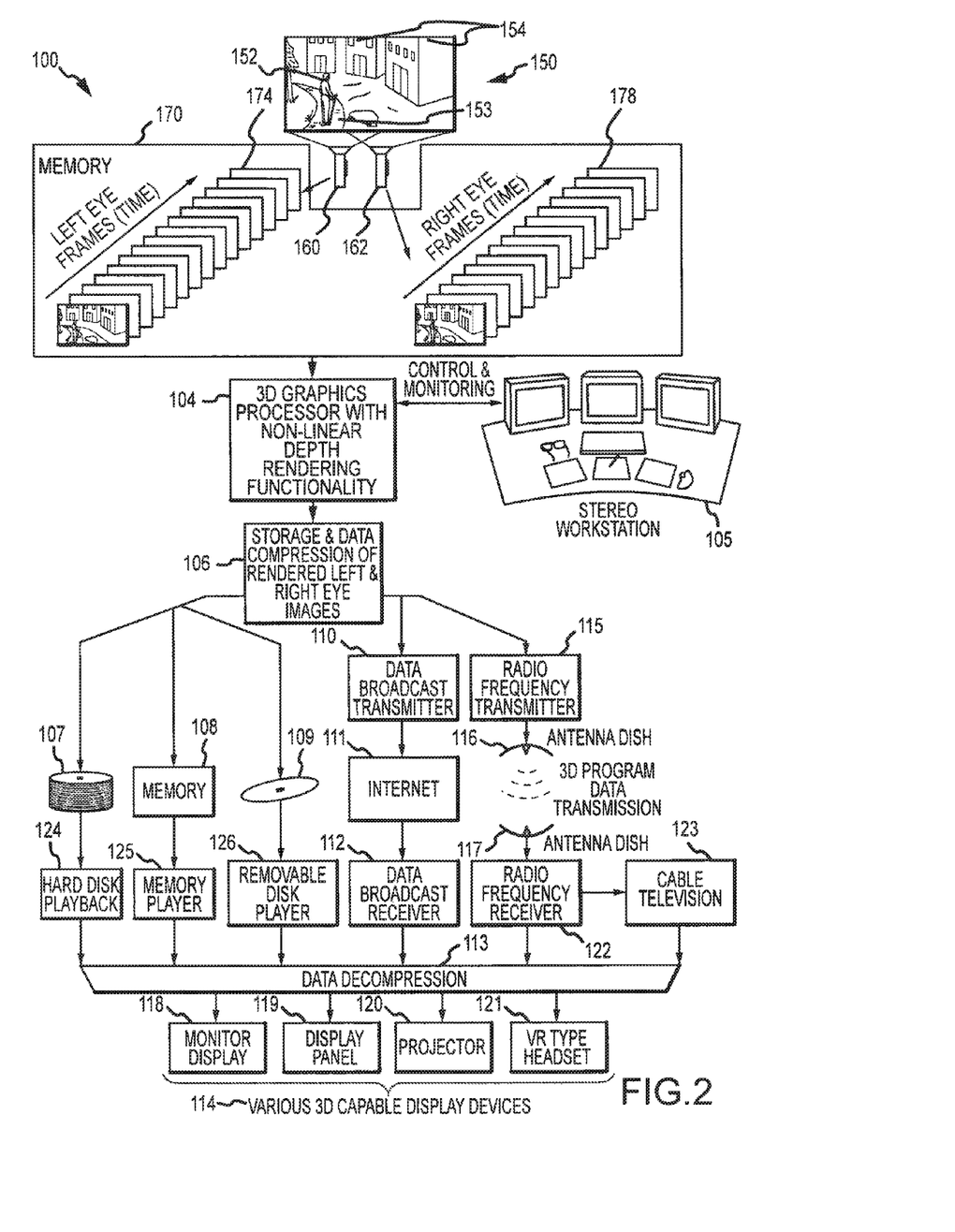
FIG. 2 is an embodiment of a stereoscopic image generation and distribution system with a 3D graphics processor configured to perform at least a portion of the depth rendering in a non-linear manner.

FIG. 2 illustrates a representative stereoscopic image generation and distribution system 100 that may be used by an animator, stereographer, or the like to produce left and right images or frames of an image stream with unique depth effects. The system 100 includes content 150 (e.g., animated frames ready for rendering) with foreground objects 152 (such as characters, framing elements, and the like) and background objects 154 (e.g., objects behind the foreground objects such as other characters, landscape elements, and the like). The content or animated/modeled scene 150 is filmed or rendered based upon position and other parameters (such as lens setting, axis, toe in, and the like) of a pair of virtual cameras 160, 162. The content from the cameras 160, 162 is rendered by the 3D graphics processor using its non-linear depth rendering functionality and is stored (or digitized and stored in some live action implementations) in memory 170. As shown, the rendered content is stored as a plurality or set of frames or images 174 arranged in a time order for the left eye (i.e., left eye images or a left eye image stream) and a plurality or set of frames or images 178 for the right eye (i.e., left eye images or a right eye image stream). Typically, upon initial rendering the number of frames are equal in each set 174, 178 and are arranged in the same time order, e.g., a frame in set 174 will correspond to a paired or corresponding frame in set 178 such that a similar content 150 is shot or rendered at a particular point in time but from a differing perspective or position of cameras 160, 162.

The system 100 includes a 3D graphics processor 104 (e.g., one or more processors or CPUs running graphics and other software/algorithms described herein) to render the image (and perform, in some embodiments, other functions used to create an animated work such as modeling, animation, compositing, and the like). The processor 104 functions to render the frames or images 174, 178 and store them in memory 170 with at least some distances being determined using non-linear depth functions or disparity being defined by such non-linear functions (or defined by a look up table that provides a non-linear relationship between distance between an object and the camera along the Z-axis and disparity). The specific non-linear rendering algorithms implemented by the processor 104 are described in detail below.

Control and monitoring of the operation of the processor 104 is performed via a stereo workstation 105 and may include a user (e.g., an animator or a stereographer) operating or interacting with a 3D graphics processor, editing modules and monitors, and/or other film processing tools such as may be used in animated work productions. In the illustrated exemplary system 100, the processor 104 is implemented and controlled by a user working at a stereo workstation 103 at which the user may access an interactive user interface and image processing tools and may, in some embodiments, control and monitor the results of the processor 104 (e.g., as it runs to select and adjust depth and/or disparity relationships of objects of the image sets 174, 178 being created from content 150). The functions implemented by the processor 104 may be performed by one or more processors/controllers. Moreover, these functions can be implemented employing a combination of software, hardware and/or firmware taking into consideration the particular requirements, desired performance levels, and the like for a given system or application.

The workstation 105 may include multiple monitors, three-dimensional glasses, and one or more user input mechanisms such as a keyboard, a mouse or trackball, drawing tablet(s), and a drawing pen. The workstation 105 may also include a processor that provides signals to the monitors, controls the visual displays at these monitors, and receives and processes user inputs provided to the system via the user input mechanisms, e.g., controls the interactive interface or the like. The processor may provide, in conjunction with the three-dimensional glasses, when the glasses are synchronized to a signal from the processor, a three-dimensional image at an application monitor, which is updated to allow the user to observe changes in the depth or placement of various objects within the composited alternate eye image. In some embodiments, an interface may be provided to allow an operator to select one or more objects in a scene or animated content 150 and to assign a depth function to that object or objects such as linear rendering for some objects, a non-linear depth rendering function to another set of objects, and a differing non-linear depth rendering function to yet another set of objects (while in other cases the same depth rendering technique is applied to all objects).

The primary eye images and the alternate eye images (e.g., the images rendered using non-linear depth rendering) may be stored via storage and data compression 106 performed by processor 104. The images or files may be stored on hard disk, on tape, or on any other form of data storage. In the interest of conserving space on the above-mentioned storage, the digital data of the images may be compressed otherwise files sizes can become large especially when dealing with a fill-length animated work or digitized live action film. Data compression also may be desired when the information passes through a system with limited bandwidth, such as a broadcast transmission channel.

The primary and alternate eye images (or stereoscopic images) 174, 178 after rendering/processing by processor 104 and/or workstation 105 can be stored in many forms. The image data can be stored on a hard disk 107 such as for hard disk playback 124, in removable or non-removable memory 108 such as for use by a memory player 125, or on removable disks 109 such as for use by a removable disk player 126, which may include but is not limited to digital versatile disk (DVD) players. The primary and alternate eye images (or stereoscopic images) can also be compressed into the bandwidth necessary to be transmitted by a data broadcast receiver 110 across the Internet 111 or other digital communications network, and then received by a data broadcast receiver 112 and decompressed (e.g., via data decompression 113), making it available for use via 3D-capable display devices 114. Similar to broadcasting over the Internet 111, the primary and alternate eye images (or stereoscopic images) created by the methods described herein can be transmitted by way of electromagnetic or RF (radio frequency) transmission by a radio frequency transmitter 115. This includes direct conventional television transmission as well as satellite transmission employing an antenna dish 116. The images can also be transmitted by satellite and received by an antenna dish 117, decompressed, and viewed on a monitor display 118, possibly incorporating a cathode ray tube (CRT), a display panel 119 such as a plasma display panel (PDP) or a liquid crystal display (LCD), a front or rear projector 120 in the home, industry, or in the cinema, or a virtual reality (VR) headset 121. If the stereoscopic images are broadcast by way of RF transmission, the receiver 122 may feed a display device directly. Another use for the stereoscopic images produced by the inventive processes is distribution via cable television 123.

Figure 3:
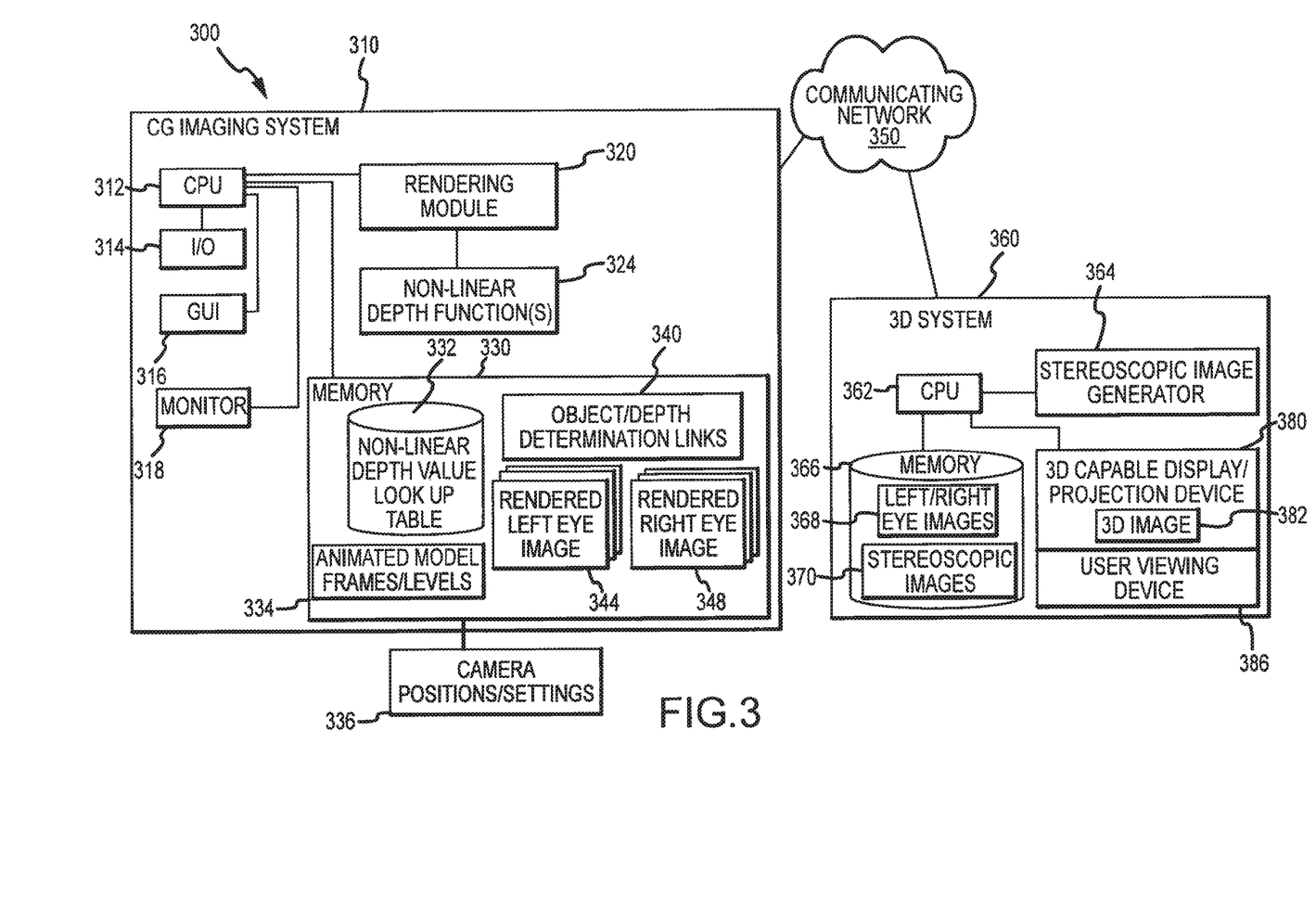
FIG. 3 is a functional block diagram of a system for producing primary and alternate eye images by performing non-linear depth rendering (at least for some objects) and for generating and displaying/projecting stereoscopic images to viewers based on these unique primary/alternate eye image streams.

FIG. 3 illustrates a functional block diagram of a stereoscopic system 300 of one embodiment of the invention that is configured or adapted to perform non-linear depth rendering as part of the process of creating stereoscopic images. As shown, the system 300 includes a computer generated (CG) imaging system 310, such as a typical computer system/network running software/firmware implementing the processes of the present invention (such as process 700 of FIG. 7). The CG imaging system 310 is linked to a digital communications network 350, such as the Internet, a local area network, a wide area network, or the like, to communicate or transfer generated left and right eye images in digital form to a 3D generation/projection system 360 for display to a viewer. The CG imaging system 310 includes a CPU 312 controlling one or more I/O devices 314, a GUI 316, and a monitor 318 such as to allow a user (e.g., an animator, editor, or the like) to view frames or images captured with primary and alternate eye cameras, to select and assign depth rendering functions to one or more objects, and to initiate non-linear depth rendering. A rendering module or engine 320 is run by the CPU 312 to render the left and right eye images using non-linear depth functions 324 as necessary to define the disparity relationship between objects and their distance from the cameras (e.g., in place of conventional linear depth techniques such as ray casting or ray tracing).

The CG imaging system 310 includes memory 330 (which may also be provided separately and accessible to the CPU 312 such as via network 350). The memory 330 stores a non-linear depth value look up table 332, which may define a depth of an object (that differs from the linear depth) or define a disparity for a linear depth (that differs from the standard linear relationship).

Memory 330 may store animated content ready for rendering such as animated models or frames/levels containing such animated models 334 or such digital data may be transferred to or accessed by the rendering module 320 (such as via network 350) as needed for rendering. The memory 330 also stores positions 336 of primary and alternate eye cameras including offsets and whether the cameras are parallel or positioned with toe in and other parameters. The camera positions 336 are used by the rendering module 320 to image or film the content 334 to produce left eye images 344 and right eye images 348 (or primary and alternate eye images). Significantly, the rendering module 320 also uses the non-linear depth function or functions 324 and/or look up table 332 to determine the disparity (typically-given in pixels) for the rendered objects. The functions 324 or table 332 may be applied by the rendering module 320 for all objects in the scene 334 or a user may interact with the GUI 316 and/or I/O 314 to assign a function 324 or the look up table to one or more of the objects (with the rest being set to a default or being handled using linear depth rendering techniques). For example, a first background object may be assigned a depth function 324 that provides a curved relationship with disparity while a second background image is assigned or linked to the look up table 332 (or multiple tables may be provided in memory 330), and any other objects such as a foreground object may be rendered using linear techniques or a default non-linear relationship (such as a table 332 or one of the depth functions 324). As a result, the rendered left eye images 344 and rendered right eye images 348 are rendered at least in part utilizing non-linear depth techniques.

The rendered images 344, 348 may then be transferred on removable data storage media and transfer of that media to a 3D system 360 or, as shown, via network 350. The 3D system 360 includes a CPU 362 that stores the received images 368 in memory 366. The 3D system 360 operates a stereoscopic image generator 364 to process the images 368 (as and if necessary) to form stereoscopic images 370 for display/projection as 3D images 382 with a 3D capable display/projection device 380. For example, the generator 364 may apply a particular polarization or colorization to the images 368 to form the stereoscopic images 370 such that a viewer may view the 3D images 382 by use of correctly polarized glasses or other viewing devices 386. As discussed above, the left and right eye images 368 are presented to the viewer such that the viewer is able to see or view the left eye images with their left eye and see or view the right eye images with their right eye (e.g., in a rapidly alternating or switching manner or concurrently). The use of the left/right eye images 368 that are created with non linear depth rendering creates a desired special effect or introduced artifact (such as space warping) in the 3D image 382 and may provide better usage of the available storytelling space (e.g., less wasted space or depth).

Figure 4:
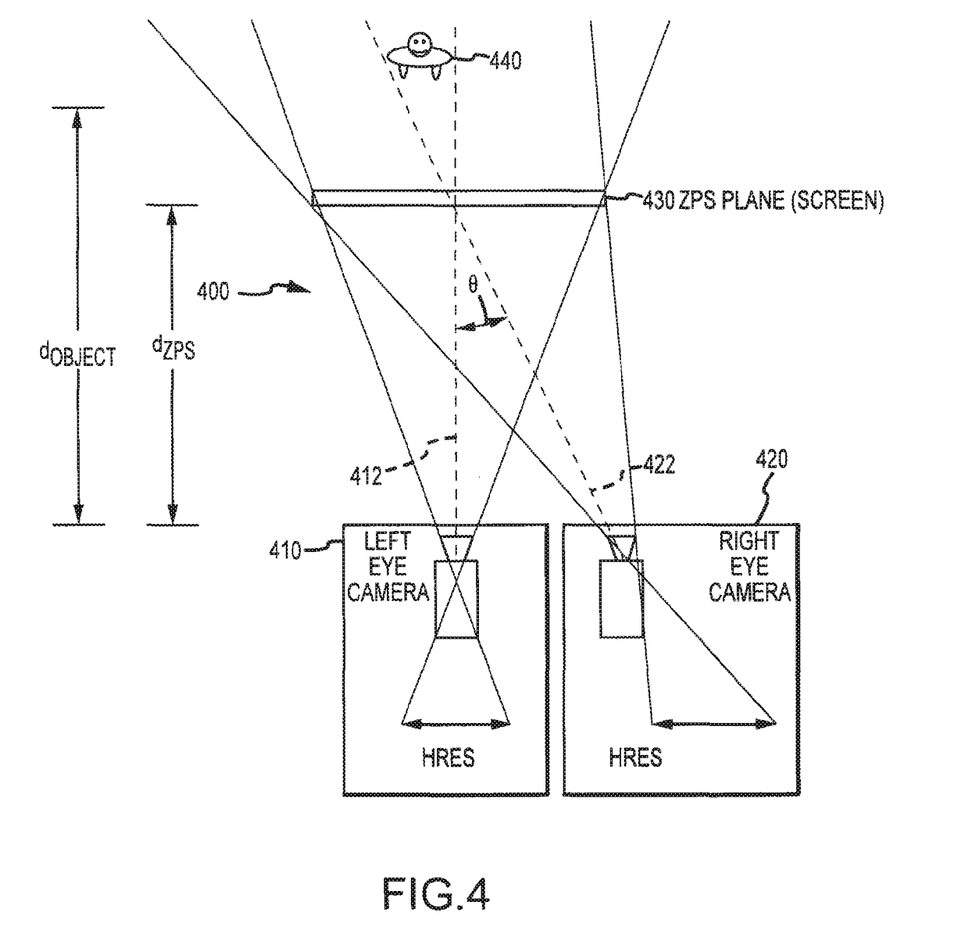
FIG. 4 is a schematic illustration of rendering of an animated model/object with a left and right virtual camera pair showing a relationship between pixel disparity and an object's distance from the camera along the Z-axis.

FIG. 4 illustrates a modeled scene (or animated image level) 400 that is being prepared for use in rendering a stereoscopic image. As shown, a left eye camera 410 is provided with a particular camera axis 412, and a right eye camera 420 is provided at a horizontal offset and with a camera axis 422 (e.g., an axis showing that the camera is provided in a toe in position). In the scene 400, a zero pixel shift (ZPS) plane (e.g., the screen) 430 is positioned a distance, $d_{ZPS}$, from the cameras 410, 420. The scene 400, of course, would include one or more objects 440 that may be animated models of characters, physical structure, or the like and that are located or positioned a distance, $d_{Object}$, from the cameras 410, 420.

In conventional CG imaging, linear depth processing is used as part of the rendering of the scene 400. Pixel disparity for an object, which is the horizontal offset in pixels between a left eye image and a right eye image, is given by the equation:

$$PD = HRES*(DZ-ZPS)/MC$$

where PD is the pixel disparity at a given distance from the camera, HRES is the horizontal resolution of an image for the camera in pixels (e.g., HRES is 2,048 pixels in some implementations or may be another value), DZ is the distance of an object from a camera as measured along the Z-axis, ZPS is the distance of the ZPS plane (which is the convergence point of the camera axes 412, 422), and MC is the slope of convergence between the left and right camera axes 412, 422 (i.e., change in horizontal displacement/change in distance from camera) that may also be expressed as an angular value, θ. As can be appreciated, the disparity, PD, varies linearly with the distance from the camera, DZ.

According to embodiments of the invention, however, non-linear depth rendering is used to establish an arbitrary relationship between the disparity, PD, and an object's distance, DZ (or shown as $d_{Object}$) from the camera. This relationship may be driven by a function (e.g., a transfer function defining a simple or complex curve) or a look-up table. This allows a stereographer or other user of the non-linear depth rendering methods described herein to create the appearance of volume throughout a scene or to reduce wasted space. Without such non-linear rendering, the scene may have suffered from cardboarding when it was imaged or rendered within comfortable depth limits.

Figure 5:
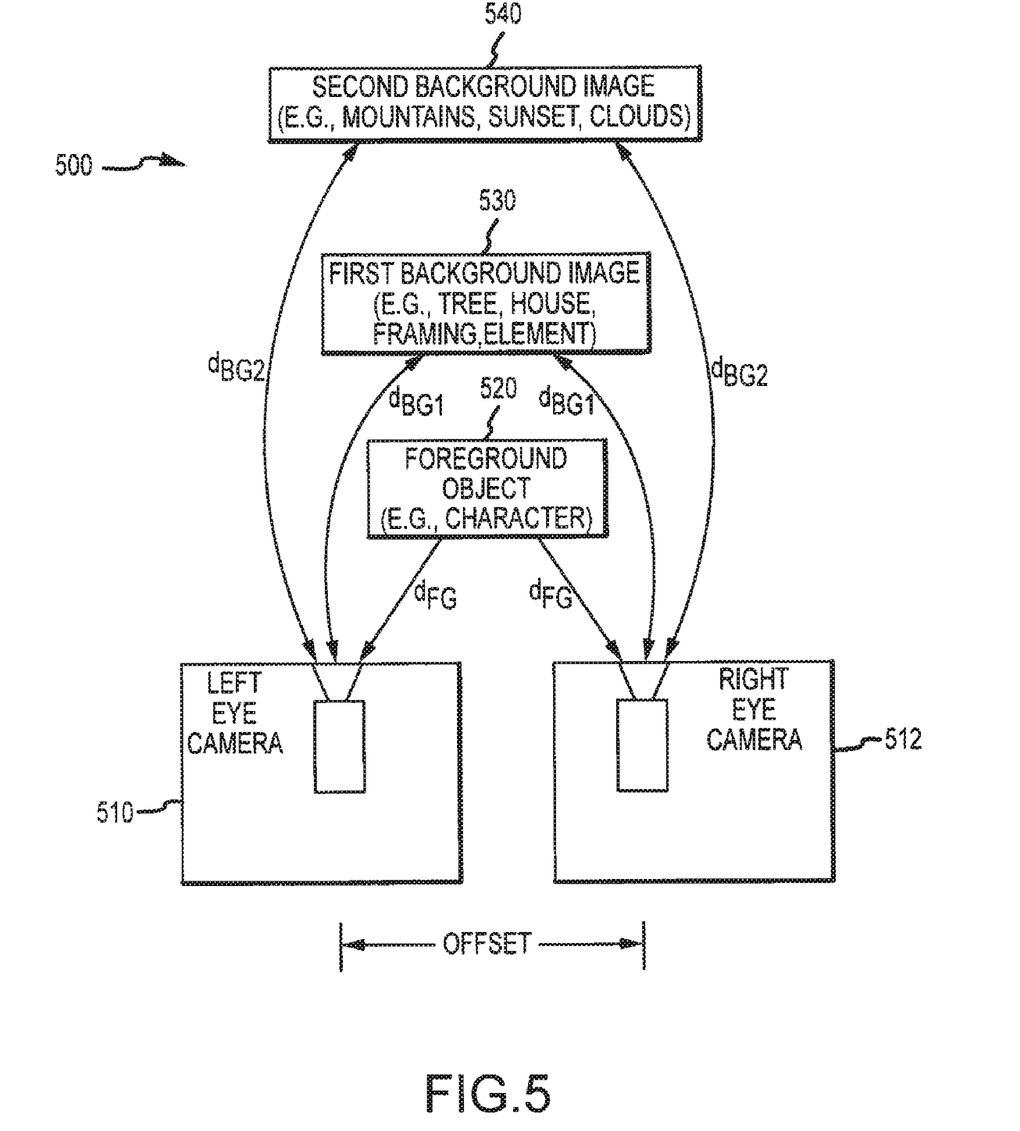
FIG. 5 is a simple schematic of non-linear rendering of animated models/objects at differing distances from the cameras showing implementation of linear rendering for a foreground object and two, object-specific non-linear depth functions (or table look up values) to provide a non-linear depth for two background images.

FIG. 5 illustrates schematically a scene 500 that is being rendered using non-linear depth relationships according to an embodiment of the invention. As shown, a pair of virtual cameras 510, 512 are positioned (parallel in this case) with a particular horizontal offset. The scene 500 includes three modeled objects 520, 530, 540, which may be animated models on one to three image levels that are to be composited. For example, the object 520 may be a foreground figure such as a character of interest in the scene 500 while the other two objects 530, 540 may be background elements such as a framing element, a tree, a house, or the like and an environmental element such as distant mountains, a sunset, clouds, or the like. The first background object 530 is spaced apart from the foreground object 520 but not a large distance while the second background object 540 is spaced apart from both objects 520, 530 a larger distance.

With such a scene, a stereographer may determine that the scene 500 should be rendered using a single non-linear depth relationship between the location of the object and the disparity. Or, as shown, the stereographer may assign three differing depth functions or relationships to the objects 520, 530, 540. As indicated, the depth relationship, $d_{FG}$, between the cameras and the foreground object 520 are defined using linear techniques such as conventional ray tracing or ray casting depth algorithms. In contrast, the depth relationship, $d_{BG1}$, for the first background object 530 is defined with a curve (or other non-linear) function that may be defined with an algorithm (or software module) or with disparity values for particular depths as defined in a look up table in memory. The depth relationship, $d_{BG2}$, for the second background object 540 is defined with a differing curve (or other non-linear) function, which again may be defined with logic or code or with values stored in memory. For example, the depth relationship for the second background object may be chosen to be more dramatic to remove a greater amount of space while the depth relationship for the first background may be more subtle or nearly linear (e.g., remove subpixels or only a small number of pixels between the foreground object 520 and the first background image 530 or the like).

Figure 6:
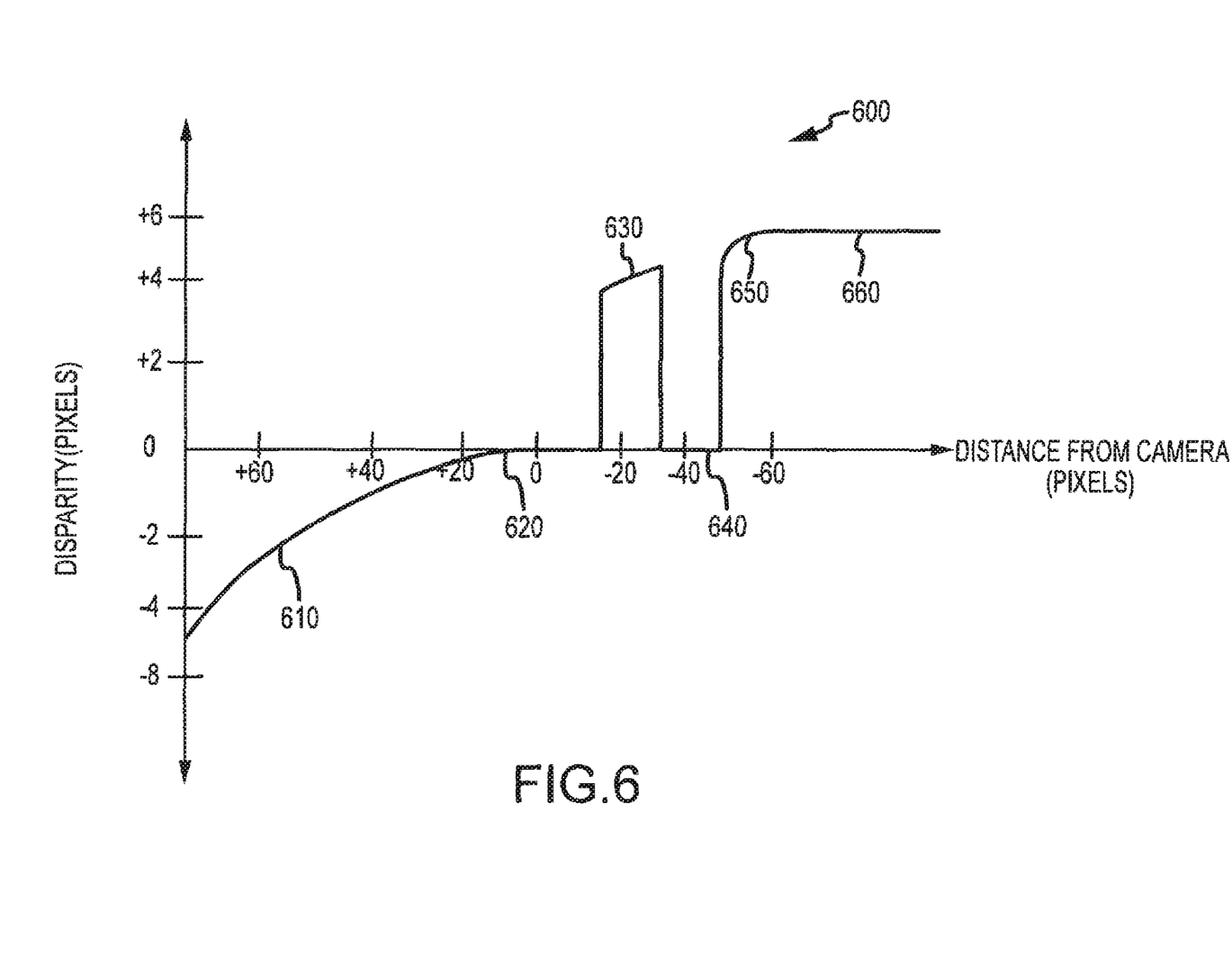
FIG. 6 illustrates one example of a non-linear function (or transfer function) that may be used in place of linear depth rendering algorithms to provide non-linear depth for a rendered image (or rendered left and right eye images)

FIG. 6 illustrates a graph 600 of one representative non-linear depth rendering function that can be used to define disparity for an object based on its distance from the camera rather than using linear techniques. The function 600 may be implemented with an algorithm or function module called by a rendering engine or module or may be provided by a look up table (e.g., look up a distance of an object from a camera to obtain a corresponding disparity). As shown, the function may be a curve 610 used to define disparity (e.g., negative parallax) for objects close to the camera (or in the theater space) while a second curve 620 (e.g., a linear curve) may be used for objects located a range of distances from the camera that are proximate to the screen plane (DZ varies a particular amount from ZPS distance). A step may then be taken to define a third portion or curve 630 in the function 600 for objects in this next distance range. Another step may be taken to define a fourth portion 640 of the function 600 (e.g., a step used to remove wasted space), and additional portions 650 and 660 may be used to define the disparity relationship to distance for objects that are farther from the camera (e.g., to provide a cap or maximum disparity for distal objects to maintain viewer comfort for the rendered images).

FIG. 6 is just one example of a somewhat more complex function for defining the relationship between disparity and an object's distance from a camera, but it is not intended to be limiting with those skilled in the art understanding that nearly any technique for defining a non-linear relationship may be employed to practice the invention (e.g., to provide desired volume to particular objects while limiting space being spent upon or wasted upon empty space between objects and while providing a desired, comfortable viewing experience).

Figure 7:
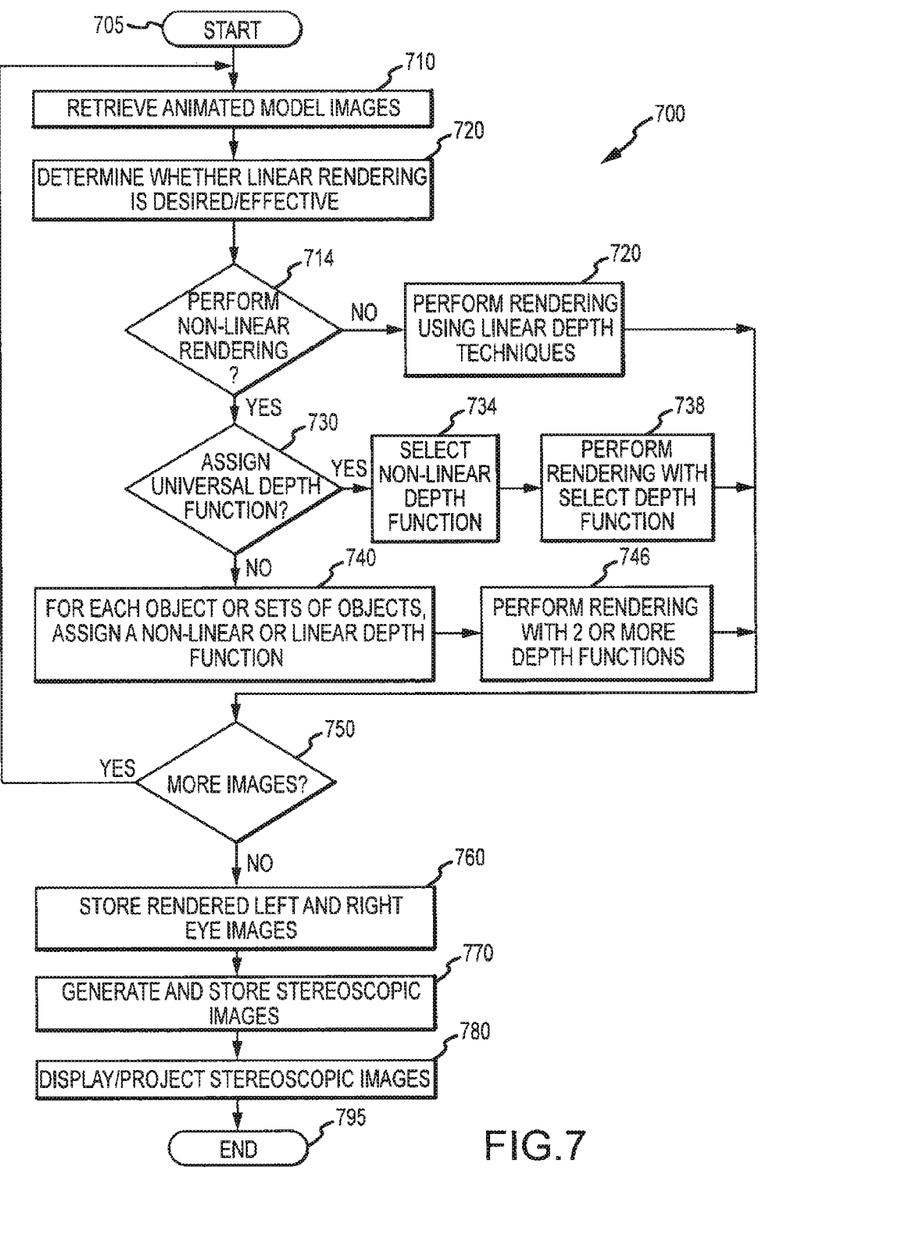
FIG. 7 is a flow chart of a method of performing non-linear depth rendering during the formation of CG images and use for creation and display of stereoscopic images to a viewer or audience.

FIG. 7 illustrates a method 700 for creating and displaying stereoscopic images using non-linear depth rendering techniques. The method 700 typically is implemented in a computer system or network such as, but not limited to, those shown in FIGS. 2 and 3, and, in some cases, all or portions of the method 700 may be implemented with software or program code devices stored in memory or on magnetic media devices that is then accessed or read by a computer processor to cause the computer to perform one or more of the steps of the method 700.

As shown, the method 700 starts at 705 such as by loading appropriate rendering, user interface, and other software (such as 3D graphics applications) onto a workstation or computer system. At 710, the method 700 continues with creating or retrieving from memory images of animated models (e.g., modeled and rigged characters and other elements may be animated and then composited). At 714, the source data (e.g., images of animated models) is evaluated to determine whether linear rendering is acceptable and should be used during rendering or whether the scene or images would be better rendered with non-linear depth rendering. The former may be the case when all objects readily fit within an allotted storytelling space (such as within a depth of 70 pixels or the like). The latter may be the case when there is a significant amount of wasted space or depth as measured along the Z-axis between some of the objects or when parallax (either negative or positive) is too great when disparity and depth relationships for all the objects is linear.

At 714, the method 700 includes querying whether non-linear depth rendering is to occur, and when not, the method 700 proceeds with performing rendering 720 using conventional linear techniques such as ray tracing. If non-linear depth rendering is to be performed, the method 700 continues at 730 with a determination (such as by querying a user via a GUI or the like) whether a single depth function (or look up table) is to be applied. If so, the method 700 includes at 734 a user selecting a non-linear depth function to apply during the rendering process and at 738 the scene or image is rendered with the selected non-linear depth function. If not, at 740, a user is prompted (such as a user interface) to assign or link a non-linear or linear depth function to each of the objects (individually or as part of sets such as all objects in the foreground, all in the background, all objects on a particular image level, or the like). At 746, rendering is performed by a processor calling rendering logic, which in turn calls the selected depth functions to assist it in defining disparity values.

At 750, the method 700 determines whether additional images need to be rendered and, if so, the process 700 continues at 710. If not, the method 700 continues at 760 with storing the rendered left and right eye images (e.g., images from steps 720, 738, and/or 746). At 770, stereoscopic images are generated such as by coloring the left and right eye images for viewing with colored glasses or polarizing the images for later viewing with proper glasses. At 780, the stereoscopic images are displayed or projected for viewing by a viewer that is, when necessary, wearing proper viewing equipment. The method 700 then ends at 795.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, the above description stresses or highlights the creation of a non-linear depth relationship by tracing curved rays back to a stereo base with two cameras at a fixed interaxial separation. Another ready extension of these concepts is an embodiment or case where a non-linear depth relationship is forged by utilizing a synthetic interaxial separation that varies with the distance from camera such as based upon a user defined function. If the equation that was defined above to illustrate a linear depth relationship is considered (i.e., PD=HRES+(DZ−ZPS)/MC)), there is a linear relationship between the disparity, PD, and the distance from camera, DZ, as long as the slope of convergence, MC, remains constant or substantially constant. However, the slope of convergence is a function of the interaxial separation.

Hence, by varying the separation as a function of the value of DZ, the disparity at any given distance can be tailored to suit a particular application such as to forge or create a non-linear relationship. The inventors recognize that the concept of varying the interaxial separation with distance may be an important aspect of non-linear depth rendering that can be used in the methods and systems described herein to practice one or more embodiments of the invention.

Numerous 3D projection systems and techniques may be used to create, display/project, and view stereoscopic images formed based on the left and right (or primary and alternate) eye images or image streams of the invention. For example, these systems may use side-by-side techniques (e.g., head-mounted displays), 3D glasses (e.g., liquid crystal shutter glasses, linearly polarized glasses, circularly polarized glasses, compensating anaglyph glasses, or the like), autostereogram techniques, and other 3D projection and viewing equipment such as film projectors and digital projectors (such as CRT, DLP, LCD, and the like).

We claim:

1. A computer-based method for rendering stereoscopic images, comprising:
    storing in memory a set of images comprising computer animated models;
    operating a processor to position a pair of offset, virtual cameras for imaging the set of images; and
    rendering the set of images with the processor based on a non-linear relationship between a disparity value assigned to at least one of the animated models and a distance between the cameras and the at least one of the animated models, wherein the disparity value defines a horizontal offset between a left eye image and a right eye image at the distance for the at least one of the animated models.

2. The method of claim 1, wherein the non-linear relationship is defined by a transfer function callable by the processor.

3. The method of claim 2, wherein the transfer function defines a curve.

4. The method of claim 1, wherein the non-linear relationship is defined in a table stored in the memory and the rendering comprises using the distance to retrieve the disparity value from the table.

5. The method of claim 1, wherein the rendering is performed by the processor based on an additional non-linear relationship between a disparity value assigned to another one of the animated models and a distance between the cameras and the another one of the animated models.

6. The method of claim 1, wherein the rendering includes performing rendering of at least one of the animated models using a linear relationship between another one of the animated models and a distance between the cameras and the another one of the animated models, whereby differing relationships between disparity and distance from a camera are used during the rendering for differing ones of the animated models.

7. The method of claim 1, wherein the non-linear relationship is adapted to select the disparity value such that the distance between the cameras and the at least one of the animated models is reduced, whereby the disparity value is smaller than a disparity value calculated for the at least one of the animated models based on a linear relationship.

8. A non-transitory computer readable medium for rendering computer generated images, comprising:
    computer readable program code devices configured to cause a computer to effect retrieving a set of digitized content from memory;
    computer readable program code devices configured to cause the computer to effect rendering the digitized content from a pair of offset cameras to generate left eye and right eye images with non-linear depth variation; and
    computer readable program code devices configured to cause the computer to effect storing the generated left and right eye images in the memory,
    wherein the non-linear depth variation comprises assigning disparity values, defining horizontal offset in pixels between pairs of the left and right eye images, to objects in the digitized content that are not linearly related to distances of the objects from the cameras.

9. The computer readable medium of claim 8, wherein the disparity values are retrieved from a look up table relating horizontal offsets between the left and right eye images to the distances of the objects from the cameras.

10. The computer readable medium of claim 8, wherein the disparity values are derived using a transfer function defining a curved variation in depth in the left and right eye images.

11. The computer readable medium of claim 8, wherein the digitized content comprises animated objects and wherein the depth variation differs among at least two of the animated objects, whereby disparity is linked to particular ones of the animated objects.

12. The computer readable medium of claim 8, further comprising computer readable program code devices configured to cause the computer to effect displaying on a monitor a plurality of non-linear depth functions and to effect receiving via an input device a user selected one of the non-linear depth functions, wherein the non-linear depth variation comprises assigning a disparity value to animated elements within the digitized content based on the user selected one of the non-linear depth functions.

13. A non-linear depth rendering method, comprising:
    with a computer processor, retrieving computer animated images from memory;
    establishing a first non-linear relationship between pixel disparity for a first object in the animated images and a distance from the first object to a pair of virtual cameras;
    operating the processor to render left and right eye images including the first object based on a position of the pair of virtual cameras using the first non-linear relationship for the first object; and
    establishing a second non-linear relationship between pixel disparity for a second object in the animated images and a distance from the second object to the pair of virtual cameras, wherein the second non-linear relationship differs from the first non-linear relationship established for the first object.

14. The method of claim 13, wherein the establishing of the non-linear relationship comprises storing a look up table in the memory providing a pixel disparity for number of distances between the object and the pair of virtual cameras and wherein the operating of the processor to render includes accessing the look up table with the distance from the object to the pair of virtual cameras to retrieve the pixel disparity.

15. The method of claim 13, wherein the establishing of the non-linear relationship includes defining a function defining a non-linear depth variation in the computer animated images and providing the function in the memory.

16. The method of claim 15, wherein the function defines a curve.

17. The method of claim 15, wherein the function has two or more sections comprising differing curves.

18. The method of claim 13, further comprising processing the left and right eye images to form stereoscopic images and displaying the stereoscopic images on a 3D capable device.

* * * * *